United States Patent [19]
Yoshikawa et al.

[11] Patent Number: 6,156,838
[45] Date of Patent: Dec. 5, 2000

[54] POLYAMIDE RESIN COMPOSITION AND PROCESS FOR PRODUCING THE SAME

[75] Inventors: Masaki Yoshikawa; Koji Fujimoto; Tsuneo Tamura; Takashi Ida; Sachiko Kokuryo, all of Kyoto, Japan

[73] Assignee: Unitika Ltd., Hyogo, Japan

[21] Appl. No.: 09/340,670

[22] Filed: Jun. 29, 1999

[30] Foreign Application Priority Data

| Jan. 19, 1991 | [JP] | Japan | 3-07729 |
|---|---|---|---|
| Jul. 7, 1998 | [JP] | Japan | 10-191231 |
| Oct. 9, 1998 | [JP] | Japan | 10-288001 |
| Oct. 9, 1998 | [JP] | Japan | 10-288002 |
| Oct. 12, 1998 | [JP] | Japan | 10-289240 |
| Oct. 16, 1998 | [JP] | Japan | 10-295310 |
| Jun. 15, 1999 | [JP] | Japan | 11-168203 |

[51] Int. Cl.$^7$ .............. C08K 3/22; C08K 3/34; C08K 3/16; C08K 77/00
[52] U.S. Cl. .......... 524/789; 524/433; 524/436; 524/443; 524/449; 524/451; 524/791; 524/879
[58] Field of Search .................. 524/433, 436, 524/443, 449, 451, 789, 791, 879

[56] References Cited

U.S. PATENT DOCUMENTS

| 4,739,007 | 4/1988 | Okada et al. | 524/789 |
|---|---|---|---|
| 5,204,078 | 4/1993 | Tateyama et al. | 423/331 |
| 5,248,720 | 9/1993 | Deguchi et al. | 524/444 |
| 5,414,042 | 5/1995 | Yasue et al. | 524/789 |
| 5,741,601 | 4/1998 | Kishida et al. | 428/474.4 |

FOREIGN PATENT DOCUMENTS

| 0 771 854 A2 | 5/1997 | European Pat. Off. | C08L 101/00 |
|---|---|---|---|
| 3-07729 | 1/1991 | Japan | C08G 69/04 |
| 5-339498 | 12/1993 | Japan | C08L 77/00 |

*Primary Examiner*—Peter A. Szekely
*Attorney, Agent, or Firm*—Sughrue, Mion, Zinn, Macpeak & Seas, PLLC

[57] ABSTRACT

A polyamide resin composition comprising a copolyamide and silicate layers originating from a swellable fluoromica, dispersed in said copolyamide on a molecular level, wherein an average thickness and an average aspect ratio (length/thickness) of the silicate layers are within specific ranges. Also disclosed is a process for preparing the polyamide resin composition.

16 Claims, No Drawings

POLYAMIDE RESIN COMPOSITION AND PROCESS FOR PRODUCING THE SAME

FIELD OF THE INVENTION

This invention relates to a polyamide resin composition which exhibits high tensile elongation and transparency, and is useful for preparing films, sheets, fibers and molded articles. Further, it relates to a polyamide resin composition comprising a copolyamide and silicate layers originating from a swellable fluoromica dispersed in the copolyamide on a molecular level and having a certain size.

This invention also relates to a process for producing the above-described polyamide resin composition.

BACKGROUND OF THE INVENTION

Polyamide resin compositions reinforced with fibrous reinforcing materials such as glass fiber and carbon fiber or inorganic fillers such as calcium carbonate are widely known. However, since these reinforcing materials have poor affinity to polyamide, the reinforced polyamide resin compositions have reduced toughness while mechanical strength and heat resistance are improved. Further, molded articles of a fiber-reinforced polyamide resin composition suffer from appreciable warp. Additionally, in using the inorganic fillers, substantial improvement in mechanical strength or heat resistance cannot be obtained unless they are added in a large quantity.

In order to eliminate these disadvantages of conventional reinforced polyamide resin compositions, a composition comprising polyamide resin and silicate layers dispersed in the polyamide resin on the molecular level by introducing polyamide chains into the laminae of a layered silicate has been proposed. Examples of such compositions are disclosed in the specifications of U.S. Pat. No. 4,739,007 in the case of using polyamide and montmorillonite, and U.S. Pat. No. 5,414,042 in the case of using polyamide and fluoromica-based minerals.

Although its mechanical properties, heat resistance and warp when molded are improved, the above-described composition, when converted into films or fibers, still suffers from insufficient tensile elongation and poor transparency due to the high crystalinity of nylon 6 which is typically used as a matrix.

A polyamide resin composition for film comprising copolyamide resin and 0.05 to 1.5 wt % of a layered silicate dispersed in the resin has been proposed (in unexamined Japanese patent No. 5-339498) to obtain excellent transparency and surface gloss. However, the transparency of the composition is not adequate and the dispersion of layered silicate in the copolyamide is not considered to be at a molecular level. This is because the polyamide resin composition is obtained by mixing or kneading a copolyamide and a layered silicate.

SUMMARY OF THE INVENTION

It is therefore an object of the present invention to provide a polyamide resin composition exhibiting high tensile elongation and transparency useful for preparing films, fibers, etc., and a process for producing the same.

As a result of extensive studies, the present inventors have discovered that the above problems of the prior art can be solved by polymerizing monomers to form a certain copolyamide in the presence of a swellable fluoromica having a certain average particle size.

The present invention provides a polyamide resin composition comprising (A) a copolyamide and (B) silicate layers originating from a swellable fluoromica, dispersed in said copolyamide on a molecular level, wherein an average thickness and an average aspect ratio (length/thickness) of the silicate layers are within specific ranges.

The present invention also provides a process for producing the polyamide resin composition which comprises polymerizing specific monomer components in the presence of a swellable fluoromica having an average particle size of 6 μm or less.

DETAILED DESCRIPTION OF THE INVENTION

The polyamide resin composition comprises copolyamide having dispersed therein silicate layers of a swellable fluoromica (referred to hereinafter as "fluoromica") on a molecular level. The language "on a molecular level" as used herein means that the layers of the layered silicate are spaced 20 Å or more from each other on average. The spacing between layers of the layered silicate is the distance between the centers of gravity of substantially every layer of a layered silicate. The language "dispersed" as used herein means that individual laminae or laminates having not more than 5 laminae, on average, of a layered silicate are present in parallel with each other and/or at random, wherein not less than 50%, preferably 70% or more, of the laminae or laminates being dispersed without forming masses. More specifically, photographic observation from transmission electron microscopy (TEM) can confirm such a dispersed state.

In the polyamide resin composition of the present invention, the size of silicate layers of fluoromica, when stated in terms of an average thickness T[Å] and an average aspect ratio (length/thickness) A, should satisfy following equations:

$T \leq 30$ and $A \geq 30$ in the case of nylon 6/12 copolymer as a matrix, $T \leq 50$ and $A \geq 20$ in the case of nylon 6/66 copolymer as a matrix, $T \leq 40$ and $A \geq 25$ in the case of copoly(caproamide/m-xylylene terephthalamide) or copoly(caproamide/m-xylylene isophthalamide) as a matrix, and $T \leq 40$ and $A \geq 25$ in the case of copoly(caproamide/bis(4-aminocyclohexyl)methane terephthalamide] or copoly [caproamide/bis(4-aminocylcohexyl)methane isophthalamide] as a matrix, $T \leq 40$ and $A \geq 25$ in the case of copoly[caproamide/bis(3-methyl-4-aminocyclohexyl)methane terephthalamide] or copoly[caproamide/bis(3-methyl-4-aminocyclohexyl) methane isophthalamide] as a matrix.

If the average thickness of silicate layers exceeds the specific value according to each copolymer matrix, or the average aspect ratio is less than the specific value according to each copolymer matrix, the polyamide resin composition thus obtained provides molded articles which are opaque and have low tensile elongation. The average thickness and the average aspect ratio herein can be determined from the observation of a TEM photograph described below.

In this invention, the matrix resin constituting the polyamide resin composition most desirably is a specific copolyamide such as those exemplified below. When silicate layers from fluoromica are dispersed in the copolyamide on a molecular level and in a specific size as stated above, a polyamide resin composition having excellent tensile elongation property and transparency suitable for films or fibers is obtained.

Nylon 6/12 copolymer has caproamide units and dodecamide units as repeating units, usually obtained by copolymerization of nylon-6 monomer ($\epsilon$-caprolactam and/or 6-aminocaproic acid) and nylon-12 monomer ($\omega$-laurolactam and/or 12-aminododecanoic acid).

Nylon 6/66 copolymer has caproamide units and hexamethylene adipamide units as repeating units, usually obtained by copolymerization of nylon-6 monomer ($\epsilon$-caprolactam and/or 6-aminocaproic acid) and nylon-66 salt (a salt of hexamethylenediamine and adipic acid).

Copoly(caproamide/m-xylylene terephthalamide) or copoly(caproamide/m-xylylene isophthalamide) (hereinafter these two copolyamides together are referred to as "nylon6/MXD copolymer") has caproamide units and m-xylylene terephthalamide units, or caproamide units and m-xylylene isophthalamide units as repeating units, respectively, usually obtained by copolymerization of nylon-6 monomer ($\epsilon$-caprolactam and/or 6-aminocaproic acid) and m-xylylenediamine/terephthalic acid salt or m-xylylenediamine/isophthalic acid salt, respectively.

Copoly[caproamide/bis(4-aminocyclohexyl)methane terephthalamide] or copoly[caproamide/bis(4-aminocyclohexyl)methane isophthalamide] (hereinafter these two copolyamides together are referred to as "nylon6/PACM copolymer") has caproamide units and bis(4-aminocyclohexyl)methane terephthalamide units, or caproamide units and bis(4-aminocyclohexyl)methane isophthalamide units as repeating units, respectively, usually obtained by copolymerization of nylon-6 monomer ($\epsilon$-caprolactam and/or 6-aminocaproic acid) and bis(4-aminocyclohexyl)methane/terephthalic acid salt or bis(4-aminocyclohexyl)methane/isophthalic acid salt, respectively.

Copoly[caproamide/bis(3-methyl-4-aminocyclohexyl) methane terephthalamide] or copoly[caproamide/bis(3-methyl-4-aminocyclohexyl)methane isophthalamide] (hereinafter these two copolyamides together are referred to as "nylon6/DMPACM copolymer") has caproamide unit and bis(3-methyl-4-aminocyclohexyl)methane terephthalamide units, or caproamide unis and bis(3-methyl-4-aminocyclohexyl)methane isophthalamide units as repeating units, respectively, usually obtained by copolymerization of nylon-6 monomer ($\epsilon$-caprolactam and/or 6-aminocaproic acid) and bis(3-methyl-4-aminocyclohexyl) methane/terephthalic acid salt or bis(3-methyl-4-aminocyclohexyl)methane/isophthalic acid salt, respectively.

The monomer component ratio of those copolymers is preferably within the range of 96/4~50/50 (mole percent ratio of caproamide unit/comonomer unit), more preferably 85/15~50/50, and most preferably 70/30~50/50. If the content of the caproamide unit is more than 96 mol %, the effect of copolymerization becomes small and results in a polyamide resin composition having insufficient elongation property. If the content of the caproamide unit is less than 50 mol %, a strand drawn after polymerization becomes too sticky to handle and a problem of increased cost often arises.

The copolyamide preferably has a relative viscosity ranging from 1.5 to 5.0, preferably 2.0 to 5.0 as measured at a concentration of 1 g/dl in 96 wt % concentrated sulfuric acid at 25° C. If the relative viscosity is less than 1.5, the mechanical strength in the form of a film, etc., decreases remarkably. If it is more than 5.0, the processability decreases remarkably.

The fluoromica for use in the present invention has a layer structure made up of negatively charged laminae mainly comprising a silicate and alkali metal cations therebetween which are ion-exchangeable. The preferred cation exchange capacity of the layered silicate ranges from 50 to 200 meq/100 g as measured by the method described below. If it is less than 50 meq/100 g, exfoliation of the fluoromica can be insubstantial during polymerization. If it is more than 200 meq/100 g, the bond between layers is so firm that the fluoromica is difficult to exfoliate.

The fluoromica is represented by the following formula, and is readily synthesized.

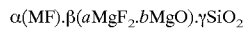

$$\alpha(MF).\beta(aMgF_2.bMgO).\gamma SiO_2$$

(wherein M represents sodium or lithium; $\alpha$, $\beta$, $\gamma$, a, and b each represents a coefficient satisfying $0.1 \leq \alpha \leq 2$, $2 \leq \beta \leq 3.5$, $3 \leq \gamma \leq 4$, $0 \leq a \leq 1$, $0 \leq b \leq 1$, and a+b=1)

Such fluoromica can be synthesized by, for example, a so-called melting method which comprises completely melting a mixture of silicon oxide, magnesium oxide and various fluorides in an electric oven or gas oven at 1400 to 1500° C., and cooling the melt to crystallize a fluoromica and allowing the crystals to grow.

The swellable fluoromica can also be obtained by a method comprising heating a mixture of talc and alkali fluoride or alkali silicofluoride in a porcelain crucible at 700 to 1200° C. for a short time to intercalate alkali metal ion into the spacings of the talc laminae (as disclosed in U.S. Pat. No. 5,204,078). The amount of alkali fluoride or alkali silicofluoride that is mixed with the talc is preferably in a range of from 10 to 35 wt % based on the mixture. If it is out of this range, the production yield decreases.

The production of the fluoromica can be confirmed by a wide-angle X-ray diffractometry analysis in which a peak corresponding to the thickness of the fluoromica is within 12 to 13 Å as the alkali metal ion intercalation proceeds.

The alkali metal of the alkali fluoride or the alkali silicofluoride should be sodium or lithium, which may be used singly or in combination. When used as the alkali metal, potassium fails to provide a swellable fluoromica, but could be used in a limited amount in combination with sodium and/or lithium for the purpose of swelling control. The swelling can also be controlled by adding a small amount of alumina to the mixture.

The following are some processes for manufacturing the polyamide resin composition.

In the present invention, it is most desirable to copolymerize nylon 6 monomer ($\epsilon$-caprolactam and/or 6-aminocaproic acid) and the above-described comonomer in the presence of fluoromica having an average particle size of 6 μm or less, preferably 1 to 6 μm. If the particle size exceeds 6 μm, the dispersity of silicate layers into the copolyamide matrix becomes inadequate and results in molded articles having insufficient transparency and tensile elongation.

In the polyamide resin composition of the present invention, the amount of the fluoromica is preferably 0.1 to 10 parts, more preferably 0.5 to 5 parts, most preferably 2 to 5 parts, by weight per 100 parts by weight of polyamide monomer to form the copolyamide. If it is less than 0.1 part by weight, the reinforcing effect to the copolyamide resin matrix by fluoromica is insubstantial for obtaining a polyamide resin composition having excellent mechanical strength and heat resistance. If it is more than 10 parts by weight, the transparency and elongation properties of the molded articles deteriorate.

The copolymerization conditions are not particularly limited, and can be conducted within the ranges of a temperature of 240 to 300° C., a pressure of 2 to 30 kg/cm$^2$ and a reaction time of 1 to 15 hours.

In order to improve the dispersity of fluoromica into the copolyamide matrix, the mixture containing the above-described monomers dispersed in water may be, prior to the copolymerization, stirred with an agitating tool such as a homogenizer to obtain high revolution and high shear, or stirred in an autoclave at a higher temperature, or stirred using a combination of both means.

Addition of an acid at the copolymerization also promotes the dispersion of silicate layers of fluoromica into the copolyamide matrix, resulting in a polyamide resin composition which provides higher tensile elongation and higher transparency.

For the above purpose, any acid, either organic or inorganic, can be used without particular limitation as long as its pKa (in 25° C. water) is 0 to 6 or negative. If it exceeds 6, improvement in mechanical strength or heat resistance is not substantial because of reduced proton release. Useful acids include benzoic acid, sebacic acid, formic acid, acetic acid, monochloroacetic acid, trichloroacetic acid, trifluoroacetic acid, nitrous acid, phosphoric acid, phosphorous acid, hydrochloric acid, hydrobromic acid, hydroiodic acid, nitric acid, sulfuric acid, perchloric acid, fluorosulfonic acid-pentafluoroantimony (1:1) (available from Aldrich under the trade name of Magic Acid) and fluoroantimonic acid.

The addition amount of the acid is preferably 3 or less moles, more preferably, 0.5 to 2 moles, per mole of the cation exchange capacity of the fluoromica. If the acid addition amount exceeds 3 moles per mole of the cation exchange capacity, it tends to be difficult to increase the molecular weight of the copolyamide.

If desired, the polyamide resin composition can contain various additives, such as heat stabilizers, antioxidants, reinforcing agents, pigments, weathering agents, flame retardants, plasticizers, mold release agents, and the like, as long as the effects of the present invention are not impaired. These additives are added to the polymerization system or while the resin composition is melt-kneaded or melt-molded.

Suitable heat stabilizers or antioxidants include hindered phenols, phosphorus compounds, hindered amines, sulfur compounds, copper compounds, alkali metal halides, and mixtures thereof.

Suitable reinforcing agents include clay, talc, calcium carbonate, zinc carbonate, wollastonite, silica, alumina, magnesium oxide, calcium silicate, sodium aluminate, sodium aluminosilicate, magnesium silicate, glass balloons, carbon black, zeolite, hydrotalcite, metal fiber, metal whiskers, ceramic whiskers, potassium titanate whiskers, boron nitride, graphite, glass fiber and carbon fiber.

The polyamide resin composition can be mixed with other thermoplastic polymers as long as the effects of the present invention are not impaired. In this case, the polymers are blended into the polyamide resin composition when melt-kneaded or melt-molded. Examples of thermoplastic polymers with which the polyamide resin composition of the present invention can be blended include polycaproamide (nylon 6), poly(tetramethylene adipamide) (nylon 46), poly(hexamethylene adipamide) (nylon 66), poly(hexamethylene sebacamide) (nylon 610), poly(hexamethylene dodecamide) (nylon 612), poly(undecamethylene adipamide) (nylon 116), polyundecamide (nylon 11), polydodecamide (nylon 12), poly(trimethyhexamethylene terephthalamide) (nylon TMDT), poly(hexamethylene isophthalamide) (nylon 6I), poly(hexamethylene terephthal/isophthalamide) (nylon 6T/6I), poly[bis(4-aminocyclohexyl)methane dodecamide], (nylon PACM12), poly[bis(3-methyl-4-aminocyclohexyl)methane dodecamide] (nylon dimethyPACM12), poly(m-xylylene adipamide), (nylon MXD6), poly(nonamethylene terephthalamide) (nylon 9T), poly(undecamethylene terephthalamide) (nylon 11T), poly(undecamethylene hexahydroterephthalamide) [nylon 11T(H)], and a copolyamide or mixed polyamide thereof.

Other polymers which can be blended into the polyamide resin composition include elastomers such as polybutadiene, butadiene-styrene copolymers, acrylic rubber, ethylene-propylene copolymers, ethylene-propylene/diene copolymers, natural rubber, chlorinated butyl rubber and chlorinated polyethylene, and acid-modified elastomers (e.g., maleic anhydride modified-elastomer), styrene-maleic anhydride copolymers, styrene-phenylmaleimide copolymers, polyethylene, polypropylene, butadiene-acrylonitrile copolymers, poly(vinyl chloride), poly(ethylene terephthalate), polyacetal, poly(vinylidene fluoride), polysulfone, poly(phenylene sulfide), poly(ether sulfone), phenoxy resins, poly(phenylene ether), poly(methyl methacrylate), poly(ether ketone), polycarbonate, polytetrafluoroethylene and polyarylate.

The polyamide resin composition of the present invention can be converted into films or sheets by general methods such as a tubular method, T-die casting method or solution casting method. Such films or sheets are suitable for wrapping films and the like in view of their high tensile elongation and transparency.

Monofilaments obtained from the present polyamide resin composition by melt-spinning have excellent tensile elongation and transparency, and are suitable for artificial turf, etc.

The polyamide resin composition of the present invention can be molded using general molding methods such as injection molding, extrusion molding, blow molding and sintering molding. The molded articles thus obtained can be used for tanks, tubes, or hoses in the automobile field, or wire coating material in the electric and electronics fields in view of their excellent tensile elongation properties.

The present invention will be now illustrated in greater detail with reference to the following Examples. However, the present invention should not be construed as being limited thereto. The raw materials that were used are as follows.

1. Raw materials
(1) Fluoromica

A mixture of 85 wt % of talc having been ground in a ball mill to an average particle size of 10 $\mu$m and 15 wt % of sodium silicofluoride having the same average particle size was placed in a porcelain crucible and reacted at 850° C. for 1 hour in an electric oven. The resulting powder was analyzed by wide-angle X-ray diffractometry with a Rigaku RAD-rB diffractometer. As a result, the peak corresponding to a thickness of 9.2 Å in the c-axis direction of the starting talc disappeared, and a peak corresponding to 12 to 13 Å was observed, which indicated the production of fluoromica.

The powder was then jet-milled with a Nippon Pneumatic PJM-200 at an air pressure of 2 to 3 kg/cm$^2$ to obtain 4 $\mu$m- or 8 $\mu$m-sized fluoromica, while oversized particles were eliminated by passing through a 400 mesh sieve.

2. Methods of Measurements
(a) Average Particle Size of Fluoromica

Measured with a Shimadzu SALD-2000 particle size analyzer (laser diffraction scattering method) equipped with a flow-cell in methanol as a medium.

(b) Cation Exchange Capacity of Fluoromica

Measured by the method of Frank O. Jones, Jr. (cf. Clay Handbook, 2nd Ed. p.587 Gihodo Publishing, 1987). In a 250 ml flask, 50 ml of 2 wt % fluoromica aqueous dispersion, 15 ml of 3 wt % aqueous hydroperoxide, and 0.5 ml of 5N sulfuric acid are mildly boiled for 10 minutes. After cooling, 0.5 ml of 1/100N methylene blue solution is added to the mixture while shaking thoroughly for 30 seconds. One droplet of the mixture is taken from the flask with a glass stick, dripped onto a filter paper, and then checked as to whether or not a bright blue ring appears around a dark blue spot. A 0.5 ml portion of the methylene blue solution is repeatedly added until the blue ring appears. When it appears, the flask is shaken for 2 minutes and the paper is again dripped. If the ring disappears after shaking, then the methylene blue solution is added until the ring does not disappear. The end point is established at the point when the ring does not disappear even after shaking for 2 minutes.

Cation exchange capacity (referred to hereinafter as "CEC") of fluoromica calculated using the following equation is 70 meq/100 g.

CEC(meq/100 g)=[amount of added methylene blue (meq)]×100/[amount of fluoromica used (g)]

Because all the interlayer cations of fluoromica used in the Examples constitute sodium, 1 meq/100 g of the CEC equals to 1 mmol/100 g.

(c) Monomer component ratio of copolyamide in the polyamide resin composition 200 mg of polyamide resin composition (in pellet form after being refined and dried) were dissolved in 3 ml of deutriated trifluoroacetic acid, and subjected to a $^{13}$C-NMR measurement at 25° C. (Japan Electrics, Type Lambda300WB). The monomer component ratio was calculated from intensities of peaks attributed to carbonyl carbon.

(d) Size of silicate layers in polyamide resin composition (thickness, aspect ratio)

A small piece is cut out from a plane parallel to a longer direction of a bending test specimen (ASTM D-790) and sliced into an ultra-thin piece with an ultra microtome. Photographs are taken with a TEM (Type JEM-200CX, Acceleration Voltage 100kV, by Japan Electrics) for the thin slices at a magnification of 100,000 to investigate the dispersity of silicate layers. The photographs are surveyed by an image analyzer (Spica 2, by Japan Avionics) to estimate average thickness and average length of silicate layers (n=100) in photograph images.

(e) Relative viscosity of polyamide resin composition

Dried pellets of polyamide resin composition are dissolved in 96% sulfuric acid at a concentration of 1 g/dl. The measurement is done at 25° C.

(f) Transparency of polyamide resin composition

Parallel beam transmittance and haze are measured for a 2 mm-thick plate with a color measuring system Z-Σ90 by Nipon Denshoku.

The transparency improves as parallel beam transmittance rises or haze decreases.

(g) Tensile strength and tensile elongation at break.
Measured in accordance with ASTM D-638.

EXAMPLE 1

1.0 kg of ε-caprolactam, 1.0 kg of 12-aminododecanoic acid and 200 g of fluoromica (average particle size 4 $\mu$m, CEC corresponds to 0.14 mole) was added to 1 kg of water and stirred with a homogenizer for 1 hour.

Into a 30 L volume reactor which was in advance charged with 8 kg of ε-caprolactam were introduced the above-described mixture and 16.1 g (0.14 mole) of 85 wt % phosphoric acid aqueous solution. The reaction system was then heated. When the temperature reached 180° C., agitation was initiated and continued for 1 hour at the same temperature.

The temperature and the pressure were then elevated to 260° C. and 5 kg/cm$^2$, respectively. The reaction system was maintained at a temperature of 260° C. and a pressure of 5 kg/cm$^2$ for 2 hours to conduct polymerization while gradually releasing steam, followed by pressure release to atmospheric pressure over a 1 hour period. After standing under conditions of atmospheric pressure and 260° C. for 40 minutes, the reaction mixture was withdrawn in strands, cooled to solidify, and cut to obtain pellets of nylon 6/12 resin composition.

The pellets were refined in 95° C. hot water for 8 hours and then dried in vacuo. The resulting pellets were injection molded in an injection molding machine (IS80G-3A Model, manufactured by Toshiba Machine, Ltd.) at a cylinder temperature of 260° C. and a mold temperature of 50° C. for an injection time of 6 seconds and a cooling time of 6 seconds to prepare 2 mm thick plates for transparency testing. 3.2 mm thick specimens were also prepared in the same manner as above except that the mold temperature was 70° C.

EXAMPLE 2

1.0 kg of ε-caprolactam, 3.0 kg of 12-aminododecanoic acid and 200 g of fluoromica (average particle size 4 $\mu$m, CEC corresponding to 0.14 mole) was added to 1.5 kg of water and stirred with a homogenizer for 1 hour.

Into a 30 L volume reactor which was in advance charged with 6 kg of ε-caprolactam were introduced the above-described mixture and 16.1 g (0.14 mole) of 85 wt % phosphoric acid aqueous solution. The pellets of nylon 6/12 resin composition were prepared in the same manner as in Example 1. After being refined in 95° C. hot water and dried, the pellets were injection molded in an injection molding machine (IS80G-3A Model, manufactured by Toshiba Machine, Ltd.) at a cylinder temperature of 260° C. and a mold temperature of 50° C. for an injection time of 6 seconds and a cooling time of 6 seconds to prepare 2 mm thick plates and 3.2 mm thick specimens for testing.

EXAMPLE 3

1.0 kg of ε-caprolactam, 5.0 kg of 12-aminododecanoic acid and 200 g of fluoromica (average particle size 4 μm, CEC corresponding to 0.14 mole) was added to 1.5 kg of water and stirred with a homogenizer for 1 hour.

Into a 30 L volume reactor which was in advance charged with 4 kg of ε-caprolactam were introduced the above-described mixture and 16.1 g (0.14 mole) of 85 wt % phosphoric acid aqueous solution. The pellets of nylon 6/12 resin composition were prepared in the same manner as in Example 1. After refined in 95° C. hot water and dried, the pellets were injection molded in an injection molding machine (IS80G-3A Model, manufactured by Toshiba Machine, Ltd.) at a cylinder temperature of 260° C. and a mold temperature of 50° C. for an injection time of 6 seconds and a cooling time of 6 seconds to prepare 2 mm thick plates and 3.2 mm thick specimens for testing.

Table 1 summarizes the results obtained in Examples 1 to 3.

solution were charged into a 30 L volume reactor. The temperature and the pressure were then elevated to 260° C. and 5 kg/cm$^2$, respectively. The reaction system was maintained at a temperature of 260° C. and a pressure of 5 kg/cm$^2$ for 2 hours to conduct polymerization while gradually releasing steam, followed by pressure release to atmospheric pressure over a 1 hour period. After standing under conditions of atmospheric pressure and 260° C. for 40 minutes, the reaction mixture was withdrawn in strands, cooled to solidify, and cut to obtain pellets of nylon 6 composition.

The pellets were refined in 95° C. hot water for 8 hours and then dried in vacuo. The resulting pellets were injection molded in an injection molding machine (IS80G-3A Model, manufactured by Toshiba Machine, Ltd.) at a cylinder temperature of 260° C. and a mold temperature of 50° C. for an injection time of 6 seconds and a cooling time of 6 seconds to prepare 2 mm thick plates for transparency testing. 3.2 mm thick specimens were also prepared in the same manner as above except that the mold temperature was 70° C.

COMPARATIVE EXAMPLE 2

10 kg of 1 2-aminododecanoic acid, 200 g of fluoromica (average particle size 4 μm, CEC corresponds to 0.14 mole), 16.1 g (0.14 mole) of 85 wt % phosphoric acid aqueous solution and 2.5 kg of water were charged into a 30 L volume reactor. The reation system was then heated. When the temperature reached 180° C., the agitation was initiated and continued for 1 hour at the same temperature. The temperature and the pressure were then elevated to 220° C. and 12 kg/cm$^2$, respectively. The reaction system was maintained at a temperature of 220° C. and a pressure of 12 kg/cm$^2$ for 2 hours to conduct polymerization while gradually releasing steam, followed by pressure release to atmospheric pressure over a 1 hour period. After standing under conditions of atmospheric pressure and 220° C. for 40

TABLE 1

| | | EXAMPLE No. | | |
|---|---|---|---|---|
| | | 1 | 2 | 3 |
| Condition of Production | Polyamide | Nylon 6/12 | Nylon 6/12 | Nylon 6/12 |
| | Average Particle Size of Fluoromica (μm) | 4.0 | 4.0 | 4.0 |
| | Monomer Charged (CL/12-ADA) | | | |
| | (kg/kg) | 9.0/1.0 | 7.0/3.0 | 5.0/5.0 |
| | (mol %/mol %) | 94.5/5.5 | 82/18 | 65.5/34.5 |
| Polyamide Resin Composition | Monomer Component Ratio of Copolyamide (N6/N12) (mol %/mol %) | 94/6 | 81/19 | 65/35 |
| | Relative Viscosity | 2.6 | 2.6 | 2.6 |
| | Average Thickness of Silicate Layers (Å) | 30 | 27 | 25 |
| | Average Aspect Ratio of Silicate Layers | 32 | 37 | 42 |
| Properties | Parallel Beam Transmittance (%) | 12 | 59 | 72 |
| | Haze (%) | 79 | 28 | 15 |
| | Tesile Strength (MPa) | 84 | 58 | 51 |
| | Tensile Elongation (%) | 48 | >200 | >200 |

COMPARATIVE EXAMPLE 1

10 kg of ε-caprolactam, 200 g of fluoromica (average particle size 4 μm, CEC corresponding to 0.14 mole) and 16.1 g (0.14 mole) of 85 wt % phosphoric acid aqueous minutes, the reaction mixture was withdrawn in strands, cooled to solidify, and cut to obtain pellets of nylon 12 resin composition.

The pellets were dried in vacuo. The resulting pellets were injection molded in an injection molding machine (IS80G-3A Model, manufactured by Toshiba Machine, Ltd.) at a cylinder temperature of 220° C. and a mold temperature of 50° C. for an injection time of 6 seconds and a cooling time of 12 seconds to prepare 2 mm thick plates and 3.2 mm thick specimens for testing.

COMPARATIVE EXAMPLE 3

1.0 kg of ε-caprolactam, 1.0 kg of 12-aminododecanoic acid and 200 g of fluoromica (average particle size 8 μm, CEC corresponding to 0.14 mole) was added to 1 kg of water. Into a 30 L volume reactor which was in advance charged with 8 kg of ε-caprolactam were introduced the above-described mixture and 16.1 g (0.14 mole) of 85 wt % phosphoric acid aqueous solution. The temperature and the pressure were then elevated to 260° C. and 5 kg/cm², respectively. The reaction system was maintained at a temperature of 260° C. and a pressure of 5 kg/cm² for 2 hours to conduct polymerization while gradually releasing steam, followed by pressure release to atmospheric pressure over a 1 hour period. After standing under conditions of atmospheric pressure and 260° C. for 40 minutes, the reaction mixture was withdrawn in strands, cooled to solidify, and cut to obtain pellets of nylon 6/12 resin composition.

The pellets were refined in 95° C. hot water for 8 hours and then dried in vacuo. The resulting pellets were injection molded to prepare 2 mm thick plates and 3.2 mm thick specimens for testing in the same manner as in Example 1.

COMPARATIVE EXAMPLE 4

1.0 kg of ε-caprolactam, 3.0 kg of 12-aminododecanoic acid and 200 g of fluoromica (average particle size 8 μm, CEC corresponding to 0.14 mole) were added to 1.5 kg of water. Into a 30 L volume reactor which was in advance charged with 4 kg of ε-caprolactam were introduced the above-described mixture and 16.1 g (0.14 mole) of 85 wt % phosphoric acid aqueous solution. The pellets of nylon 6/12 resin composition were prepared in the same manner as in Comparative Example 3. After being refined in 95° C. hot water and dried, the pellets were injection molded in an injection molding machine (IS80G-3A Model, manufactured by Toshiba Machine, Ltd.) at a cylinder temperature of 250° C. and a mold temperature of 50° C. for an injection time of 6 seconds and a cooling time of 10 seconds to prepare 2 mm thick plates and 3.2 mm thick specimens for testing.

Table 2 summarizes the results obtained in Comparative Examples 1 to 4.

TABLE 2

| | | COMPARATIVE EXAMPLE No. | | | |
|---|---|---|---|---|---|
| | | 1 | 2 | 3 | 4 |
| Condition of Production | Polyamide | Nylon 6 | Nylon 12 | Nylon 6/12 | Nylon 6/12 |
| | Average Particle Size of Fluoromica (μm) | 4.0 | 4.0 | 8.0 | 8.0 |
| | Monomer Charged (CL/12-ADA) | | | | |
| | (kg/kg) | — | — | 9.0/1.0 | 7.0/3.0 |
| | (mol %/mol %) | — | — | 94.5/5.5 | 82/18 |
| Polyamide Resin Composition | Monomer Component Ratio of Copolyamide (N6/N12) (mol %/mol %) | — | — | 94/6 | 81/19 |
| | Relative Viscosity | 2.6 | 2.6 | 2.6 | 2.6 |
| | Average Thickness of Silicate Layers (Å) | 23 | 28 | 36 | 45 |
| | Average Aspect Ratio of Silicate Layers | 36 | 32 | 27 | 22 |
| Properties | Parallel Beam Transmittance (%) | 3 | 3 | 6 | 6 |
| | Haze (%) | 93 | 89 | 88 | 85 |
| | Tesile Strength (MPa) | 84 | 51 | 89 | 64 |
| | Tensile Elongation (%) | 20 | 36 | 23 | 62 |

For each of Examples 1 to 3, the average thickness and average aspect ratio of silicate layers of fluoromica in the nylon 6/12 resin composition were 30 Å or less, and 30 or more, respectively, which indicates the uniform dispersity of silicate layers on a molecular level. The transparency of plates and the tensile elongation of specimens were both satisfactory.

In Comparative Examples 1 and 2, the transparency of plates and the tensile elongation of specimens were inadequate.

In Comparative Examples 3 and 4, average thickness and average aspect ratio of silicate layers of fluoromica in the nylon 6/12 resin composition were more than 30 Å, and less than 30, respectively, which does not indicate a uniform dispersity of silicate layers on a molecular level as compared to Examples 1 and 2. The transparency of plates and the tensile elongation of specimens were both inferior.

EXAMPLE 4

1.0 kg of ε-caprolactam and 1.0 kg of nylon66 salt ("AH salt" available from BASF A.G.) were charged into a 30 L volume reactor and stirred at 100° C. for 1 hour. Then 8 kg of ε-caprolactam, 200 g of fluoromica (average particle size 4 μm, CEC corresponding to 0.14 mole), 16.1 g (0.14 mole) of 85 wt % phosphoric acid aqueous solution and 1 kg of water were added. The system was then heated and agitated for 1 hour at 180° C.

The temperature and the pressure were then elevated to 260° C. and 5 kg/cm², respectively. The reaction system was maintained at a temperature of 260° C. and a pressure of 5 kg/cm² for 2 hours to conduct polymerization while gradually releasing steam, followed by pressure release to atmospheric pressure over a 1 hour period. After standing under conditions of atmospheric pressure and 260° C. for 40 minutes, the reaction mixture was withdrawn in strands, cooled to solidify, and cut to obtain pellets of nylon 6/66 resin composition.

The pellets were refined in 95° C. hot water for 8 hours and then dried in vacuo. The resulting pellets were injection molded in an injection molding machine (IS80G-3A Model, manufactured by Toshiba Machine, Ltd.) at a cylinder temperature of 240° C. and a mold temperature of 50° C. for an injection time of 10 seconds and a cooling time of 20 seconds to prepare 2 mm thick plates for transparency testing. 3.2 mm thick specimens for elongation testing were also prepared in the same manner as above except that the mold temperature was 70° C.

EXAMPLE 5

1.0 kg of ε-caprolactam, 3.0 kg of nylon66 salt ("AH salt" available from BASF A.G.) were charged into a 30 L volume reactor and stirred at 100° C. for 1 hour. Then 6 kg of ε-caprolactam, 200 g of fluoromica (average particle size 4 μm, CEC corresponding to 0.14 mole), 16.1 g (0.14 mole) of 85 wt % phosphoric acid aqueous solution and 1.5 kg of water were added. The pellets of nylon 6/66 resin composition were prepared in the same manner as in Example 4.

The pellets were refined in 95° C. hot water for 8 hours and then dried in vacuo. The resulting pellets were injection molded in an injection molding machine (IS80G-3A Model, manufactured by Toshiba Machine, Ltd.) at a cylinder temperature of 240° C. and a mold temperature of 50° C. for an injection time of 10 seconds and a cooling time of 30 seconds to prepare 2 mm thick plates and 3.2 mm thick specimens for testing.

EXAMPLE 6

1.0 kg of ε-caprolactam, 5.0 kg of nylon66 salt ("AH salt" available from BASF A.G.) were charged into a 30 L volume reactor and stirred at 100° C. for 1 hour. Then 4 kg of ε-caprolactam, 200 g of fluoromica (average particle size 4 μm, CEC corresponding to 0.14 mole), 16.1 g (0.14 mole) of 85 wt % phosphoric acid aqueous solution and 1.5 kg of water were added. The pellets of nylon 6/66 resin composition were prepared in the same manner as in Example 4.

The pellets were refined in 95° C. hot water for 8 hours and then dried in vacuo. Plates and specimens for testing were prepared in the same manner as in Example 5.

Table 3 summarizes the results obtained in Examples 4 to 6.

TABLE 3

|  |  | EXAMPLE No. | | |
|---|---|---|---|---|
|  |  | 4 | 5 | 6 |
| Condition of Production | Polyamide | Nylon 6/66 | Nylon 6/66 | Nylon 6/66 |
|  | Average Particle Size of Fluoromica (μm) | 4.0 | 4.0 | 4.0 |
|  | Monomer Charged (CL/AH salt) |  |  |  |
|  | (kg/kg) | 9.0/1.0 | 7.0/3.0 | 5.0/5.0 |
|  | (mol %/mol %) | 95/5 | 82/18 | 67/33 |
| Polyamide Resin Composition | Monomer Component Ratio of Polyamide (N6/N66) (mol %/mol %) | 94/6 | 82/18 | 66/34 |
|  | Relative Viscosity | 2.6 | 2.6 | 2.6 |
|  | Average Thickness of Silicate Layers (Å) | 48 | 45 | 44 |
|  | Average Aspect Ratio of Silicate Layers | 26 | 28 | 29 |
| Properties | Parallel Beam Transmittance (%) | 11 | 31 | 42 |
|  | Haze (%) | 66 | 48 | 40 |
|  | Tesile Strength (MPa) | 74 | 68 | 58 |
|  | Tensile Elongation (%) | 177 | >200 | >200 |

COMPARATIVE EXAMPLE 5

10 kg of nylon66 salt ("AH salt" available from BASF A.G.), 200 g of fluoromica (average particle size 4 μm, CEC corresponding to 0.14 mole), 16.1 g (0.14 mole) of 85 wt % phosphoric acid aqueous solution and 2.5 kg of water were charged into a 30 L volume reactor. The reaction system was then heated and continued to be agitated for 1 hour at 180° C.

The temperature and the pressure were then elevated to 220° C. and 18 kg/cm², respectively. The reaction system was maintained at a temperature of 220° C. and a pressure of 18 kg/cm² for 2 hours to conduct polymerization while gradually releasing steam, followed by pressure release to atmospheric pressure over a 1 hour period and elevation of the temperature to 270° C. After standing under conditions of atmospheric pressure and 270° C. for 40 minutes, the reaction mixture was withdrawn in strands, cooled to solidify, and cut to obtain pellets of nylon 66 resin composition.

The pellets were then dried in vacuo. The resulting pellets were injection molded in an injection molding machine (IS80G-3A Model, manufactured by Toshiba Machine, Ltd.) at a cylinder temperature of 260° C. and a mold temperature of 50° C. for an injection time of 6 seconds and a cooling time of 12 seconds to prepare 2 mm thick plates and 3.2 mm thick specimens for testing.

COMPARATIVE EXAMPLE 6

A Nylon 6/66 resin composition was obtained and tested in the same manner as in Example 4, except that fluoromica having an average particle size of 8 μm was used.

COMPARATIVE EXAMPLE 7

A Nylon 6/66 resin composition was obtained and tested in the same manner as in Example 5, except that fluoromica having an average particle size of 8 μm was used.

COMPARATIVE EXAMPLE 8

A Nylon 6/66 resin composition was obtained and tested in the same manner as in Example 6, except that fluoromica having an average particle size of 8 μm was used.

Table 4 summarizes the results obtained in Comparative Examples 5 to 8.

TABLE 4

| | | COMPARATIVE EXAMPLE No. | | | | |
|---|---|---|---|---|---|---|
| | | 1 | 5 | 6 | 7 | 8 |
| Condition of Production | Polyamide | Nylon 6 | Nylon 66 | Nylon 6/66 | Nylon 6/66 | Nylon 6/66 |
| | Average Particle Size of Fluoromica (μm) | 4.0 | 8.0 | 8.0 | 8.0 | 8.0 |
| | Monomer Charged (CL/AH salt) (kg/kg) | — | — | 9.0/1.0 | 7.0/3.0 | 5.0/5.0 |
| | (mol %/mol %) | — | — | 95/5 | 82/18 | 67/33 |
| Polyamide Resin Composition | Monomer Component Ratio of Copolyamide (N6/N66) (mol %/mol %) | — | — | 94/6 | 82/18 | 66/34 |
| | Relative Viscosity | 2.6 | 2.6 | 2.6 | 2.6 | 2.6 |
| | Average Thickness of Silicate Layers (Å) | 23 | 187 | 56 | 61 | 73 |
| | Average Aspect Ratio of Silicate Layers | 36 | 14 | 19 | 18 | 17 |
| Properties | Parallel Beam Transmittance (%) | 3 | 4 | 7 | 14 | 18 |
| | Haze (%) | 93 | 91 | 86 | 74 | 70 |

TABLE 4-continued

| | COMPARATIVE EXAMPLE No. | | | | |
|---|---|---|---|---|---|
| | 1 | 5 | 6 | 7 | 8 |
| Tesile Strength (MPa) | 84 | 68 | 78 | 70 | 68 |
| Tensile Elongation (%) | 20 | 33 | 39 | 50 | 65 |

For each of Examples 4 to 6, the average thickness and average aspect ratio of silicate layers of fluoromica in the nylon 6/66 resin composition were 50 Å or less, and 20 or more, respectively, which indicates the uniform dispersity of silicate layers of fluoromica on a molecular level. The transparency of plates and the tensile elongation of specimens were both satisfactory.

In Comparative Example 5, the transparency of plates and the tensile elongation of specimens were inadequate.

In Comparative Examples 6 to 8, the average thickness and average aspect ratio of silicate layers of fluoromica in nylon 6/66 resin composition were more than 50 Å, and less than 20, respectively, which does not indicate a uniform dispersity of silicate layers on a molecular level as compared to Examples 4 to 6. The transparency of plates and the tensile elongation of specimens were both inferior.

EXAMPLE 7

480 g of m-xylylenediamine (MXDA) and 580 g of isophthalic acid (IPA) were mixed with 1.0 kg of water and stirred at 90° C. for 1 hour. After becoming clear, the mixture solution was cooled to 25° C. The precipitate was then isolated by decantation, and vacuum dried at 25° C. for 24hours. 1.0 kg of MXDA/IPA salt was thus obtained.

1.0 kg of MXDA/IPA salt and 1.0 kg of ε-caprolactam were charged into a 30 L volume reactor and stirred at 100° C. for 1 hour. Then, 8 kg of ε-caprolactam, 200 g of fluoromica (average particle size 4 μm, CEC corresponding to 0.14 mole), 16.1 g (0.14 mole) of 85 wt % phosphoric acid aqueous solution and 1.5 kg of water were added. The system was then heated and continued to be agitated for 1 hour at 180° C.

The temperature and the pressure were then elevated to 260° C. and 5 kg/cm², respectively. The reaction system was maintained at a temperature of 260° C. and a pressure of 5 kg/cm² for 2 hours to conduct polymerization while gradually releasing steam, followed by pressure release to atmospheric pressure over a 1 hour period. After standing under conditions of atmospheric pressure and 260° C. for 40 minutes, the reaction mixture was withdrawn in strands, cooled to solidify, and cut to obtain pellets of nylon 6/MXD resin composition.

The pellets were refined in 95° C. hot water for 8 hours and then dried in vacuo. The resulting pellets were injection molded in an injection molding machine (IS80G-3A Model, manufactured by Toshiba Machine, Ltd.) at a cylinder temperature of 240° C. and a mold temperature of 50° C. for an injection time of 10 seconds and a cooling time of 20 seconds to prepare 2 mm thick plates for transparency testing. 3.2 mm thick specimens for elongation testing were also prepared in the same manner as above except that the mold temperature was 70° C.

EXAMPLE 8

Pellets of nylon 6/MXD resin composition were prepared and tested in the same manner as in Example 7, except that terephthalic acid (TPA) was used instead of IPA.

EXAMPLE 9

1440 g of MXDA and 1750 g of IPA were mixed with 3.0 kg of water and stirred at 90° C. for 1 hour. After becoming clear, the mixture solution was cooled to 25° C. The precipitate was then isolated by decantation, and vacuum dried at 25° C. for 24 hours. 3.0 kg of MXDA/IPA salt was thus obtained.

3.0 kg of MXDA/IPA salt and 1.0 kg of ε-caprolactam were charged into a 30 L volume reactor and stirred at 100° C. for 1 hour. Then, 6 kg of ε-caprolactam, 200 g of fluoromica (average particle size 4 μm, CEC corresponding to 0.14 mole), 16.1 g (0.14 mole) of 85 wt % phosphoric acid aqueous solution and 1.5 kg of water were added. Pellets of nylon 6/MXD resin composition were prepared in the same manner as in Example 7.

The pellets were refined in 95° C. hot water for 8 hours and then dried in vacuo. The resulting pellets were injection molded in an injection molding machine (IS80G-3A Model, manufactured by Toshiba Machine, Ltd.) at a cylinder temperature of 240° C. and a mold temperature of 50° C. for an injection time of 10 seconds and a cooling time of 30 seconds to prepare 2 mm thick plates and 3.2 mm thick specimens for testing.

EXAMPLE 10

Pellets of nylon 6/MXD resin composition were prepared and tested in the same manner as in Example 9, except that TPA was used instead of IPA.

Table 5 summarizes the results obtained in Examples 7 to 10.

TABLE 5

| | | EXAMPLE No. | | | |
|---|---|---|---|---|---|
| | | 7 | 8 | 9 | 10 |
| Condition of Production | Polyamide | Nylon 6/MXD | Nylon 6/MXD | Nylon 6/MXD | Nylon 6/MXD |
| | Average Particle Size of Fluoromica (μm) | 4.0 | 4.0 | 4.0 | 4.0 |
| | Composition of salt | MXDA/IPA | MXDA/TPA | MXDA/IPA | MXDA/TPA |
| | Monomer Charged (CL/salt) | | | | |
| | (kg/kg) | 9.0/1.0 | 9.0/1.0 | 7.0/1.0 | 7.0/3.0 |
| | (mol %/mol %) | 96/4 | 96/4 | 85/15 | 85/15 |
| Polyamide Resin Composition | Monomer Component Ratio(N6/MXD*) (mol %/mol %) | 95/5 | 95/5 | 85/15 | 85/15 |
| | Relative Viscosity | 2.6 | 2.6 | 2.6 | 2.6 |
| | Average Thickness of Silicate Layers (Å) | 30 | 35 | 36 | 40 |
| | Average Aspect Ratio of Silicate Layers | 33 | 31 | 29 | 27 |
| Properties | Parallel Beam Transmittance (%) | 47 | 51 | 57 | 61 |
| | Haze (%) | 44 | 35 | 30 | 27 |
| | Tesile Strength (MPa) | 75 | 80 | 69 | 71 |
| | Tensile Elongation (%) | 86 | 114 | 99 | 138 |

*indicates component other than N6 monomer.

COMPARATIVE EXAMPLE 9

A Nylon 6/MXD resin composition was obtained and tested in the same manner as in Example 7, except that fluoromica having an average particle size of 8 μm was used.

COMPARATIVE EXAMPLE 10

A Nylon 6/MXD resin composition was obtained and tested in the same manner as in Example 8, except that fluoromica having an average particle size of 8 μm was used.

COMPARATIVE EXAMPLE 11

A Nylon 6/MXD resin composition was obtained and tested in the same manner as in Example 9, except that fluoromica having an average particle size of 8 μm was used.

COMPARATIVE EXAMPLE 12

Nylon 6/MXD resin composition was obtained and tested in the same manner as in Example 10, except that fluoromica having an average particle size of 8 μm was used.

Table 6 summarizes the results obtained in Comparative Examples 9 to 12.

TABLE 6

| | | COMPARATIVE EXAMPLE No. | | | | |
|---|---|---|---|---|---|---|
| | | 1 | 9 | 10 | 11 | 12 |
| Condition of Production | Polyamide | Nylon 6 | Nylon 6/MXD | Nylon 6/MXD | Nylon 6/MXD | Nylon 6/MXD |
| | Average Particle Size of Fluoromica ($\mu$m) | 4.0 | 8.0 | 8.0 | 8.0 | 8.0 |
| | Composition of salt Monomer Charged (CL/AH salt) | — | MXDA/ IPA | MXDA/ TPA | MXDA/ ITA | MXDA/ TPA |
| | (kg/kg) | — | 9.0/1.0 | 9.0/1.0 | 7.0/3.0 | 7.0/3.0 |
| | (mol %/ mol %) | — | 96/4 | 96/4 | 85/15 | 85/15 |
| Polyamide Resin Composition | Monomer Component Ratio of Copolyamide (N6/MXD*) (mol %/ mol %) | — | 95/5 | 95/5 | 85/15 | 85/15 |
| | Relative Viscosity | 2.6 | 2.6 | 2.6 | 2.6 | 2.6 |
| | Average Thickness of Silicate Layers (Å) | 23 | 43 | 49 | 53 | 60 |
| | Average Aspect Ratio of Silicate Layers | 36 | 33 | 23 | 21 | 20 |
| Properties | Parallel Beam Transmittance (%) | 3 | 11 | 18 | 13 | 20 |
| | Haze (%) | 93 | 84 | 61 | 78 | 65 |
| | Tesile Strength (MPa) | 84 | 88 | 82 | 81 | 77 |
| | Tensile Elongation (%) | 20 | 27 | 44 | 33 | 52 |

*indicates component other than N6 monomer.

For each of Examples 7 to 1 0, the average thickness and average aspect ratio of silicate layers of fluoromica in the nylon 6/MXD resin composition were 50 Å or less, and 25 or more, respectively, which indicates the uniform dispersity of silicate layers of fluoromica on a molecular level. The transparency of plates and the tensile elongation of specimens were both satisfactory.

In Comparative Examples 9 to 12, the average thickness and average aspect ratio of silicate layers of fluoromica in polyamide resin composition were more than 50 Å, and less than 25, respectively, which does not indicate the uniform dispersity of silicate layers on a molecular level as compared to Examples 7 to 10. The transparency of plates and the tensile elongation of specimens were both inferior.

EXAMPLE 11

490 g of bis(4-aminocyclohexyl)methane (PACM) and 460 g IPA were mixed with 1.5 kg of water and stirred at 120° C. for 1 hour in a 10 L volume reactor. A solution of PACM/IPA salt was thus prepared.

The total amount of the solution of PACM/IPA salt was placed into a 30 L volume reactor which was in advance charged with 1 kg of $\epsilon$-caprolactam, 200 g of fluoromica (average particle size 4 $\mu$m, CEC corresponding to 0.14 mole) and 16.1 g (0.14 mole) of 85 wt % phosphoric acid aqueous solution and the system was stirred at 150° C. for 1 hour. 8.0 kg of $\epsilon$-caprolactam were then added. The reaction system continued to be agitated for 1 more hour at 150° C.

The temperature and the pressure were then elevated to 260° C. and 5 kg/cm$^2$, respectively. The reaction system was maintained at a temperature of 260° C. and a pressure of 5 kg/cm$^2$ for 2 hours to conduct polymerization while gradually releasing steam, followed by pressure release to atmospheric pressure over a 1 hour period. After standing under conditions of atmospheric pressure and 260° C. for 40 minutes, the reaction mixture was withdrawn in strands, cooled to solidify, and cut to obtain pellets of nylon 6/PACM resin composition.

The pellets were refined in 95° C. hot water for 8 hours and then dried in vacuo. The resulting pellets were injection molded in an injection molding machine (IS80G-3A Model, manufactured by Toshiba Machine, Ltd.) at a cylinder temperature of 240° C. and a mold temperature of 50° C. for an injection time of 10 seconds and a cooling time of 30 seconds to prepare 2 mm thick plates for transparency testing. 3.2 mm thick specimens for elongation testing were also prepared in the same manner as above except that the mold temperature was 70° C.

EXAMPLE 12

1760 g of PACM and 1390 g IPA were mixed with 1.5 kg of water and stirred at 120° C. for 1 hour in a 10 L volume reactor. A solution of PACM/IPA salt was thus prepared.

The total amount of the solution of PACM/IPA salt was placed into a 30 L volume reactor which was in advance charged with 1 kg of $\epsilon$-caprolactam, 200 g of fluoromica (average particle size 4 $\mu$m, CEC corresponding to 0.14 mole) and 16.1 g (0.14 mole) of 85 wt % phosphoric acid aqueous solution. The reaction system was stirred at 150° C. for 1 hour. 6.0 kg of $\epsilon$-caprolactam were then added. Pellets of nylon 6/PACM composition were prepared in the same manner as in Example 11.

After being refined and dried, the pellets were tested in the same manner as in Example 11.

EXAMPLE 13

650 g of bis(4-aminocyclohexyl)methane (DMPACM) and 450 g of TPA were mixed with 1.5 kg of water and stirred at 120° C. for 1 hour in a 10 L volume reactor. A solution of DMPACM/TPA salt was thus prepared.

The total amount of the solution of DMPACM/IPA salt was transported into a 30 L volume reactor which was in advance charged with 1 kg of $\epsilon$-caprolactam, 200 g of fluoromica (average particle size 4 $\mu$m, CEC corresponding to 0.14 mole) and 16.1 g (0.14 mole) of 85 wt % phosphoric acid aqueous solution. The system was stirred at 150° C. for 1 hour. 8.0 kg of $\mu$-caprolactam were then added. Pellets of nylon 6/DMPACM resin composition were prepared in the same manner as in Example 11.

After being refined and dried, the pellets were tested in the same manner as in Example 11.

EXAMPLE 14

1230 g of DMPACM and 860 g of TPA were mixed with 1.5 kg of water and stirred at 120° C. for 1 hour in a 10 L volume reactor. A solution of DMPACM/TPA salt was thus prepared.

The total amount of the solution of DMPACM/IPA salt was transported into a 30 L volume reactor which was in advance charged with 1 kg of ε-caprolactam, 200 g of fluoromica (average particle size 4 μm, CEC corresponding to 0.14 mole) and 16.1 g (0.14 mole) of 85 wt % phosphoric acid aqueous solution. The reaction system was stirred at 150° C. for 1 hour. 7.0 kg of ε-caprolactam were then added. Pellets of nylon 6/DMPACM resin composition were prepared in the same manner as in Example 11.

After being refined and dried, the pellets were tested in the same manner as in Example 11.

Table 7 summarizes the results obtained in Examples 11 to 14.

COMPARATIVE EXAMPLE 14

A Nylon 6/PACM resin composition was obtained and tested in the same manner as in Example 12, except that fluoromica having an average particle size of 8 μm was used.

COMPARATIVE EXAMPLE 15

A Nylon 6/DMPACM resin composition was obtained and tested in the same manner as in Example 13, except that fluoromica having an average particle size of 8 μm was used.

COMPARATIVE EXAMPLE 16

A Nylon 6/DMPACM resin composition was obtained and tested in the same manner as in Example 14, except that fluoromica having an average particle size of 8 μm was used.

Table 8 summarizes the results obtained in Comparative Examples 13 to 16.

TABLE 7

| | | EXAMPLE No. | | | |
|---|---|---|---|---|---|
| | | 11 | 12 | 13 | 14 |
| Condition of Production | Polyamide | Nylon 6/PACM | Nylon 6/PACM | Nylon 6/DMPACM | Nylon 6/DMPACM |
| | Average Particle Size of Fluoromica (μm) | 4.0 | 4.0 | 4.0 | 4.0 |
| | Composition of salt Monomer Charged (CL/salt) | PACM/IPA | PACM/IPA | DMPACM/TPA | DMPACM/TPA |
| | (kg/kg) | 9.0/1.0 | 7.0/3.0 | 9.0/1.0 | 8.0/2.0 |
| | (mol %/mol %) | 97/3 | 88/12 | 97/3 | 94/6 |
| Polyamide Resin Composition | Monomer Component Ratio of Copolyamide (N6/PACM*) (mol %/mol %) | 96/4 | 88/12 | 96/4 | 93/7 |
| | Relative Viscosity | 2.6 | 2.6 | 2.6 | 2.6 |
| | Average Thickness of Silicate Layers (Å) | 36 | 38 | 32 | 37 |
| | Average Aspect Ratio of Silicate Layers | 28 | 26 | 34 | 30 |
| Properties | Parallel Beam Transmittance (%) | 39 | 55 | 50 | 60 |
| | Haze (%) | 43 | 34 | 45 | 32 |
| | Tesile Strength (MPa) | 74 | 64 | 71 | 62 |
| | Tensile Elongation (%) | 97 | >200 | >200 | >200 |

*indicates component other than N6 monomer.

COMPARATIVE EXAMPLE 13

A Nylon 6/PACM resin composition was obtained and tested in the same manner as in Example 11, except that fluoromica having an average particle size of 8 μm was used.

TABLE 8

| | | COMPARATIVE EXAMPLE No. | | | | |
|---|---|---|---|---|---|---|
| | | 1 | 13 | 14 | 15 | 16 |
| Condition of Production | Polyamide | Nylon 6 | Nylon 6/PACM | Nylon 6/PACM | Nylon 6/DMPACM | Nylon 6/DMPACM |
| | Average Particle Size of Fluoromica (μm) | 4.0 | 8.0 | 8.0 | 8.0 | 8.0 |
| | Composition of salt Monomer Charged (CL/salt) | — | PACM/IPA | PACM/IPA | DMPACM/TPA | DMPACM/TPA |
| | (kg/kg) | — | 9.0/1.0 | 7.0/3.0 | 9.0/1.0 | 8.0/2.0 |
| | (mol %/mol %) | — | 97/3 | 88/12 | 97/3 | 94/6 |

TABLE 8-continued

|  |  | COMPARATIVE EXAMPLE No. | | | | |
|---|---|---|---|---|---|---|
|  |  | 1 | 13 | 14 | 15 | 16 |
| Polyamide Resin Composition | Monomer Component Ratio (N6/PACM*) (mol %/mol %) | — | 96/4 | 88/12 | 96/4 | 93/7 |
|  | Relative Viscosity | 2.6 | 2.6 | 2.6 | 2.6 | 2.6 |
|  | Average Thickness of Silicate Layers (Å) | 23 | 46 | 58 | 43 | 56 |
|  | Average Aspect Ratio of Silicate Layers | 36 | 23 | 22 | 24 | 20 |
| Properties | Parallel Beam Transmittance (%) | 3 | 15 | 25 | 21 | 30 |
|  | Haze (%) | 93 | 80 | 71 | 64 | 60 |
|  | Tesile Strength (MPa) | 84 | 78 | 70 | 80 | 74 |
|  | Tensile Elongation (%) | 20 | 28 | 34 | 41 | 47 |

*indicates component other than N6 monomer.

For each of Examples 11 to 14, the average thickness and average aspect ratio of silicate layers of fluoromica in the nylon 6/PACM resin composition or nylon 6/DMPACM resin composition were 40 Å or less, and 25 or more, respectively, which indicates the uniform dispersity of silicate layers of fluoromica on a molecular level. The transparency of plates and the tensile elongation of specimens were both satisfactory.

In Comparative Examples 13 to 16, the average thickness and average aspect ratio of silicate layers of fluoromica in the nylon 6/PACM resin composition or nylon 6/DMPACM resin composition were more than 40 Å, and less than 25, respectively, which does not indicate the uniform dispersity of silicate layers on a molecular level as compared to Examples 1 to 4. The transparency of plates and the tensile elongation of specimens were both inferior.

While the invention has been described in detail and with reference to specific examples thereof, it will be apparent to one skilled in the art that various changes and modification can be made therein without departing from the spirit and scope thereof.

What is claimed is:

1. A polyamide resin composition comprising:
   (A) nylon 6/12 copolymer; and
   (B) silicate layers originating from a swellable fluoromica, dispersed in said copolymer on a molecular level,
   wherein an average thickness of the silicate layers is 30 Å or less and an average aspect ratio (length/thickness) of the silicate layers is 30 or more.

2. A polyamide resin composition comprising:
   (A) nylon 6/66 copolymer; and
   (B) silicate layers originating from a swellable fluoromica, dispersed in said copolymer on a molecular level,
   wherein an average thickness of the silicate layers is 50 Å or less and an average aspect ratio (length/thickness) of the silicate layers is 20 or more.

3. A polyamide resin composition comprising:
   (A) copoly(caproamide/m-xylylene terephthalamide); and
   (B) silicate layers originating from a swellable fluoromica, dispersed in said copolymer on a molecular level,
   wherein an average thickness of the silicate layers is 40 Å or less and an average aspect ratio (length/thickness) of the silicate layers is 25 or more.

4. A polyamide resin composition comprising:
   (A) copoly(caproamide/m-xylylene isophthalamide); and
   (B) silicate layers originating from a swellable fluoromica, dispersed in said copolymer on a molecular level,
   wherein an average thickness of the silicate layers is 40 Å or less and an average aspect ratio (length/thickness) of the silicate layers is 25 or more.

5. A polyamide resin composition comprising:
   (A) copoly[caproamide/bis(4-aminocyclohexyl) methane terephthalamide]; and
   (B) silicate layers originating from a swellable fluoromica, dispersed in said copolymer on a molecular level,
   wherein an average thickness of the silicate layers is 40 Å or less and an average aspect ratio (length/thickness) of the silicate layers is 25 or more.

6. A polyamide resin composition comprising:
   (A) copoly[caproamide/bis(4-aminocyclohexyl) methane isophthalamide]; and
   (B) silicate layers originating from a swellable fluoromica, dispersed in said copolymer on a molecular level,
   wherein an average thickness of the silicate layers is 40 Å or less and an average aspect ratio (length/thickness) of the silicate layers is 25 or more.

7. A polyamide resin composition comprising:
   (A) copoly[caproamide/bis(3-methyl-4-aminocyclohexyl)methane terephthalamide]; and
   (B) silicate layers originating from a swellable fluoromica, dispersed in said copolymer on a molecular level,
   wherein an average thickness of the silicate layers is 40 Å or less and an average aspect ratio (length/thickness) of the silicate layers is 25 or more.

8. A polyamide resin composition comprising:
   (A) copoly[caproamide/bis(3-methyl-4-aminocyclohexyl)methane isophthalamide]; and
   (B) silicate layers originating from a swellable fluoromica, dispersed in said copolymer on a molecular level,
   wherein an average thickness of the silicate layers is 40 Å or less and an average aspect ratio (length/thickness) of the silicate layers is 25 or more.

9. A process for producing the polyamide resin composition according to claim 1, which comprises polymerizing ε-caprolactam and/or 6-aminocaproic acid and ω-laurolactam and/or 12-aminododecanoic acid in the presence of a swellable fluoromica having an average particle size of 6 μm or less.

10. A process for producing the polyamide resin composition according to claim 2, which comprises polymerizing ε-caprolactam and/or 6-aminocaproic acid and nylon 66 salt in the presence of a swellable fluoromica having an average particle size of 6 μm or less.

11. A process for producing the polyamide resin composition according to claim 3, which comprises polymerizing ε-caprolactam and/or 6-aminocaproic acid and m-xylylenediamine/terephthalic acid salt in the presence of a swellable fluoromica having an average particle size of 6 μm or less.

12. A process for producing the polyamide resin composition according to claim 4, which comprises polymerizing ε-caprolactam and/or 6-aminocaproic acid and m-xylylenediamine/isophthalic acid salt in the presence of a swellable fluoromica having an average particle size of 6 μm or less.

13. A process for producing the polyamide resin composition according to claim 5, which comprises polymerizing ε-caprolactam and/or 6-aminocaproic acid and bis(4-aminocyclohexyl)methane/terephthalic acid salt in the presence of a swellable fluoromica having an average particle size of 6 μm or less.

14. A process for producing the polyamide resin composition according to claim 6, which comprises polymerizing ε-caprolactam and/or 6-aminocaproic acid and bis(4-aminocyclohexyl)methane/isophthalic acid salt in the presence of a swellable fluoromica having an average particle size of 6 μm or less.

15. A process for producing the polyamide resin composition according to claim 7, which comprises polymerizing ε-caprolactam and/or 6-aminocaproic acid and bis(3-methyl-4-aminocyclohexyl)methane/terephthalic acid salt in the presence of a swellable fluoromica having an average particle size of 6 μm or less.

16. A process for producing the polyamide resin composition according to claim 8, which comprises polymerizing ε-caprolactam and/or 6-aminocaproic acid and bis(3-methyl-4-aminocyclohexyl)methane/isophthalic acid salt in the presence of a swellable fluoromica having an average particle size of 6 μm or less.

\* \* \* \* \*